United States Patent
Sawada et al.

(10) Patent No.: US 7,477,760 B2
(45) Date of Patent: Jan. 13, 2009

(54) VEHICLE STATE SENSING SYSTEM AND VEHICLE STATE SENSING METHOD

(75) Inventors: Mamoru Sawada, Yokkaichi (JP); Toshiki Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 694 days.

(21) Appl. No.: 11/075,180

(22) Filed: Mar. 8, 2005

(65) Prior Publication Data
US 2005/0201593 A1   Sep. 15, 2005

(30) Foreign Application Priority Data
Mar. 9, 2004   (JP) ............... 2004-065922

(51) Int. Cl.
*G06K 9/00* (2006.01)
(52) U.S. Cl. .................................... 382/104
(58) Field of Classification Search .............. 382/104; 340/435
See application file for complete search history.

(56) References Cited

U.S. PATENT DOCUMENTS

| | | | |
|---|---|---|---|
| 5,323,152 A | 6/1994 | Morita | |
| 5,757,949 A | 5/1998 | Kinoshita et al. | |
| 6,535,114 B1* | 3/2003 | Suzuki et al. | 340/435 |
| 6,840,343 B2* | 1/2005 | Mattson et al. | 180/197 |
| 2002/0001398 A1 | 1/2002 | Shimano et al. | |
| 2003/0030546 A1 | 2/2003 | Tseng | |

FOREIGN PATENT DOCUMENTS

| | | |
|---|---|---|
| EP | 1 033 085 | 9/2000 |
| JP | 9-134499 | 5/1997 |
| JP | 9-263200 | 10/1997 |
| WO | WO 01/39120 | 5/2001 |

OTHER PUBLICATIONS

Examination Report dated Mar. 20, 2007 for corresponding Japanese Applicatiion No. 2004-065922 and English translation thereof.
Search Report dated Mar. 14, 2007 for corresponding French Application No. 05 02315.
Massimo Bertozzi et al., "Vision-based intelligent vehicles: State of the art and perspectives," *Robotics and Autonomous Systems*, vol. 32, pp. 1-16 (2000).

* cited by examiner

*Primary Examiner*—Jingge Wu
*Assistant Examiner*—Amara Abdi
(74) *Attorney, Agent, or Firm*—Harness, Dickey & Pierce, PLC

(57) ABSTRACT

An on-vehicle camera captures an image of an outside visual scene that is outside of a vehicle and outputs image data of the captured image. A wheel speed sensor outputs a measurement signal, which corresponds to a moving speed of the vehicle. An ECU determines a state of the vehicle based on the measurement signal of the wheel speed sensor and an optical flow of a predetermined point of the captured image, which is captured during traveling of the vehicle. The optical flow of the predetermined point is obtained based on the image data of the captured image.

4 Claims, 3 Drawing Sheets

TRANSLATIONAL MOVEMENT

ROTATIONAL MOVEMENT

VEHICLE STATE SENSING SYSTEM AND VEHICLE STATE SENSING METHOD

CROSS REFERENCE TO RELATED APPLICATION

This application is based on and incorporates herein by reference Japanese Patent Application No. 2004-65922 filed on Mar. 9, 2004.

BACKGROUND OF THE INVENTION

1. Field of the Invention

The present invention relates to a vehicle state sensing system and a vehicle state sensing method for sensing a moving state of a vehicle based on image data of an image, which is captured through an on-vehicle camera.

2. Description of Related Art one previously proposed system recognizes a physical state (e.g., a curvature, a width) of a road lane, along which a vehicle is traveling, based on image data of an image, which is captured by, for example, an on-vehicle camera (see, for example, Japanese Unexamined Patent Publication No. H09-263200). When the vehicle approaches a curve of the road lane at an excessively high speed, the system determines a possibility of moving out of the road lane based on the recognized result.

In the above system, the surface of the road lane, i.e., the state of the surrounding environment around the traveling vehicle is sensed based on the image data of the image, which is captured by the on-vehicle camera. However, there has not been proposed a system, which determines a moving state of the vehicle (e.g., a momentum of translational movement of the vehicle) based on the image data of the image, which is captured by the on-vehicle camera.

SUMMARY OF THE INVENTION

The present invention is made with respect to the above point. Thus, it is an objective of the present invention to provide a vehicle state sensing system and a vehicle state sensing method for sensing a moving state of a vehicle based on image data of an image, which is captured by an image recognizing means, such as an on-vehicle camera.

To achieve the objective of the present invention, there is provided a vehicle state sensing system that includes an image recognizing means, a vehicle speed sensing means and a vehicle state determining means. The image recognizing means is installed in a vehicle. The image recognizing means is for capturing an image of an outside visual scene that is outside of the vehicle and is for outputting image data of the captured image. The vehicle speed sensing means is for outputting a measurement signal, which corresponds to a moving speed of the vehicle. The vehicle state determining means is for determining a state of the vehicle based on the measurement signal of the vehicle speed sensing means and an optical flow of a predetermined point of the captured image, which is captured during traveling of the vehicle. The optical flow of the predetermined point is obtained based on the image data of the captured image.

To achieve the objective of the present invention, there is also provided a vehicle state sensing method. According to the method, a moving speed of a vehicle is obtained. Also, image data of an image of an outside visual scene is obtained. The image data of the image of the outside visual scene is outside of the vehicle and is captured by an image recognizing means during traveling of the vehicle. An optical flow of a predetermined point of the captured image is obtained based on the image data. A state of the vehicle is determined based on the moving speed of the vehicle and the optical flow of the predetermined point.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
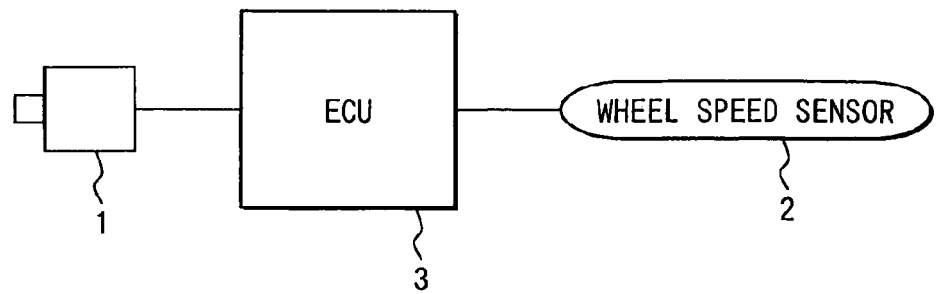
FIG. 1 is a block diagram showing a vehicle state sensing system according to an embodiment of the present invention.

FIG. 1 is a block diagram showing a vehicle state sensing system according to an embodiment of the present invention. As shown in FIG. 1, the vehicle state sensing system includes an on-vehicle camera 1, a wheel speed sensor 2 and an ECU 3 for determining the vehicle state.

The on-vehicle camera 1 captures an image of a front visual scene on a front side of a vehicle. The on-vehicle camera 1 continuously captures the image of the front visual scene during traveling of the vehicle and transmits image date of the captured image to the ECU 3.

The wheel speed sensor 2 outputs a measurement signal, which corresponds to a wheel speed of the vehicle. A vehicle speed (i.e., a moving speed of the vehicle) V is determined based on the measurement signal of the wheel speed sensor 2. A method for computing such a vehicle speed V is well known in the field of brake systems, so that details of the method for computing the vehicle speed V will not be described.

The ECU 3 senses, i.e., determines the moving state (driving state) of the vehicle based on the image data of the on-vehicle camera 1 and the measurement signal of the wheel speed sensor 2. Specifically, the ECU 3 obtains a yaw rate $\gamma$ and a slip angle $\beta$ as parameters, which indicate the moving state of the vehicle. More specifically, the yaw rate $\gamma$ indicates a vehicle rotational angular speed, i.e., a rotational angular speed of the vehicle about a vehicle center axis. The slip angle $\beta$ indicates a transverse moving speed of the vehicle, which is under translational movement.

The yaw rate $\gamma$ and the slip angle $\beta$ are obtained based on the image data of the captured image, which is captured through the on-vehicle camera 1. A way of obtaining the yaw rate $\gamma$ and the slip angle $\beta$ will be described with reference to FIGS. 2A and 2B.

Figure 2A:
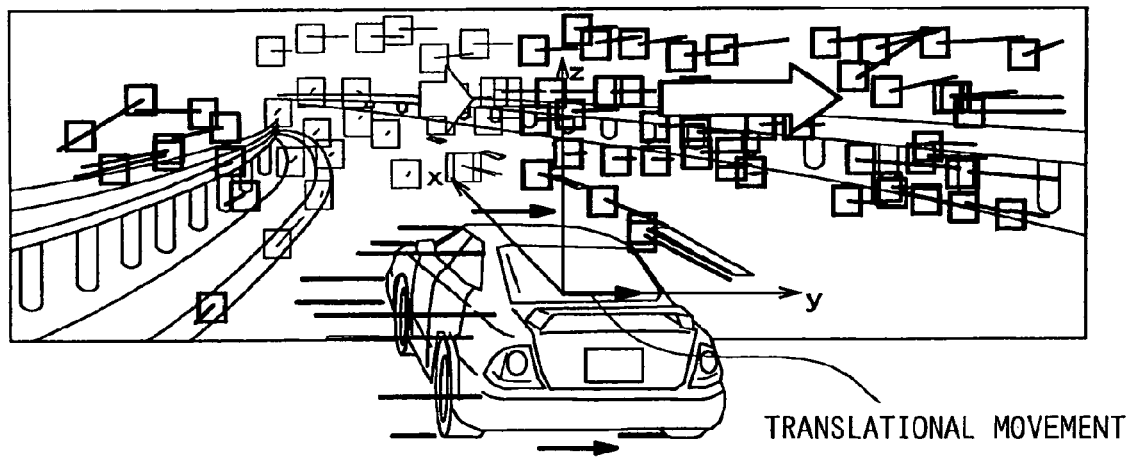
FIG. 2A is a diagram showing an optical flow in a case where a vehicle makes a translational movement in a transverse direction of the vehicle.
Figure 2B:
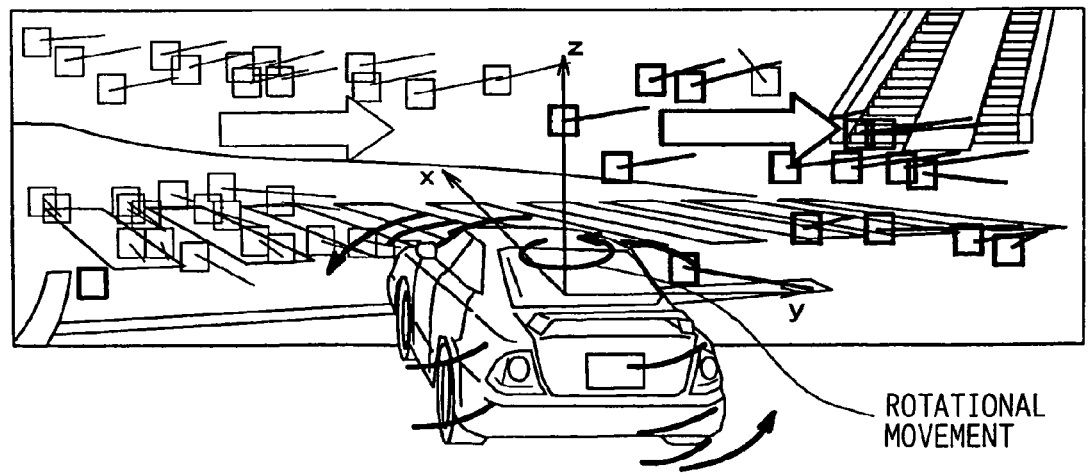
FIG. 2B is a diagram showing an optical flow in a case where the vehicle makes a rotational movement.

FIG. 2A shows an optical flow in a case where the vehicle is under the translational movement in a transverse direction i.e., a lateral direction of the vehicle. FIG. 2B shows an optical flow in a case where the vehicle is under only the rotational movement. In these drawings, a fore-and-aft direction (a longitudinal direction) of the vehicle is indicated by an X-axis. Also, the left-to-right direction is indicated by a Y-axis. Furthermore, the top-to-bottom direction (vertical direction) is indicated by a Z-axis. Thus, when the vehicle makes the translational movement in the transverse direction, the vehicle is moved on the Y-axis in the drawing. Also, when the vehicle makes the rotational movement, the vehicle is rotated about the Z-axis.

The optical flow indicates the vehicle transverse moving speed that is measured in the point of regard (a predetermined point) in the front visual scene, which is viewed through the on-vehicle camera 1. The optical flow corresponds to a vector that connects between two points, i.e., the former point of regard and the latter point of regard in an image coordinate. Here, the latter point of regard has moved from the former point of regard and is obtained upon elapse of a predetermined time period from the former point of regard. The inventors of the present invention have found that the optical flow contains the physical quantities, which indicate the moving state of the vehicle. Based on this finding, the inventors of the present invention have proposed to obtain the yaw rate γ and the slip angle β based on the optical flow.

The physical significance of the optical flow will be described.

As shown in FIG. 2A, when the vehicle makes the translational movement in the transverse direction, the optical flow of the far front point, which is located on the front side of the vehicle and is far from the vehicle, is relatively small in the image data. In contrast, the optical flow of each of the left and right points, which are located on the left and right sides, respectively, of the vehicle, is relatively large in the image data. Furthermore, as shown in FIG. 2B, when the vehicle makes the rotational movement, the optical flow of each of the front, left and right points, becomes relatively large in the image data.

Based on these results, it is clearly understood that the optical flow differs between the translational movement of the vehicle and the rotational movement of the vehicle. This means that the optical flow can indicate whether the subject movement of the vehicle is the translational movement or the rotational movement. Thus, the translational movement and the rotational movement of the vehicle can be sensed through the analysis of the optical flow of the image data of the captured image, which is captured through the on-vehicle camera 1.

Figure 3:
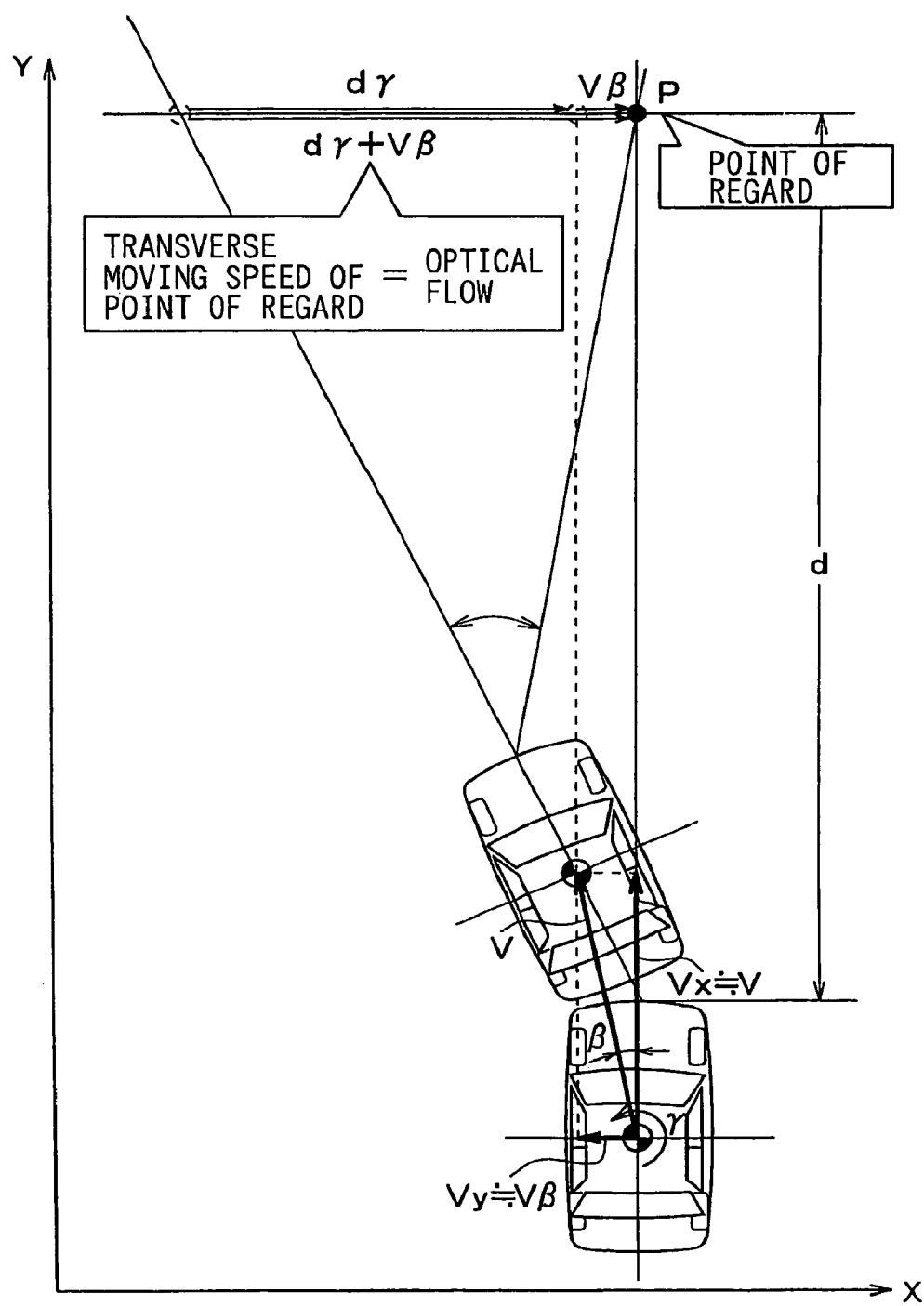
FIG. 3 is a diagram showing how a point of regard, which is located on a front side of the vehicle and is spaced from the vehicle by a predetermined distance, is moved in connection with the movement of the vehicle upon elapse of a predetermined time period.

FIG. 3 shows how a point P of regard, which is located on the front side of the vehicle and is spaced from the vehicle by a distance d, is moved in connection with the movement of the vehicle upon elapse of a predetermined time period.

With reference to FIG. 3, it is assumed that the vehicle is moving while achieving the slip angle β and the yaw rate γ. In such a case, the point P of regard is moved in the transverse direction at the velocity of d·γ+Vβ. Thus, when the transverse moving speed of the optical flow, which is obtained from the image data of the captured image, is denoted as Vy_flow, this moving speed can be expressed by the following Equation (1).

$$d\cdot\gamma+V\beta=Vy\_flow \quad (1)$$

The above Equation (1) indicates the following matter. That is, the transverse component of the optical flow of the point P of regard is expressed by the sum of the transverse moving speed Vβ of the vehicle, which is caused by the side slip of the vehicle, and the transverse moving speed d·γ of the point P of regard, which is caused by the rotational movement of the vehicle about the center of mass of the vehicle. In other words, the transverse moving speed component of the optical flow indicates the relationship between the side slip of the vehicle and the rotational movement of the vehicle.

In a case of steady circular turn of the vehicle, the slip angle β and the yaw rate γ are defined in a manner described below.

Figure 4:
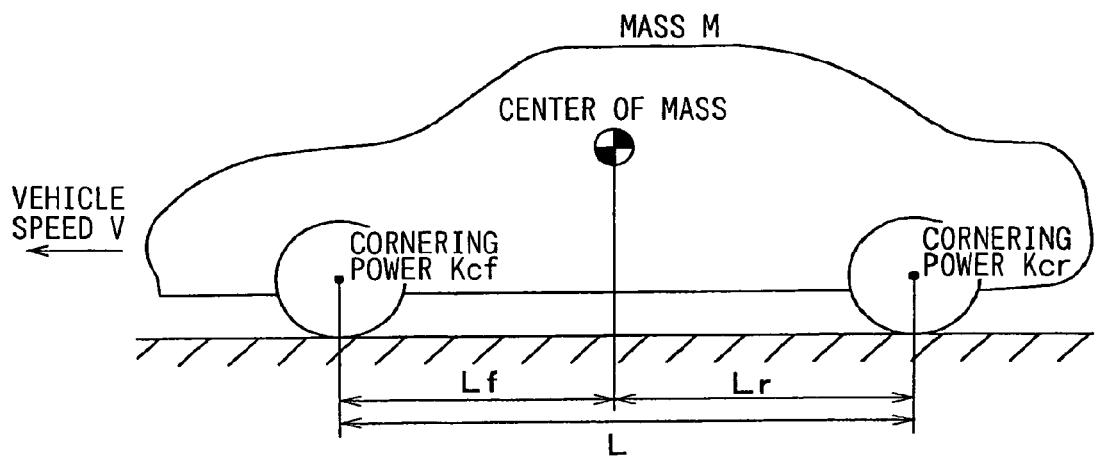
FIG. 4 is a diagram schematically showing sizes of corresponding parts of the vehicle.

FIG. 4 schematically shows the sizes of corresponding parts of the vehicle. With reference to FIG. 4, the mass of the vehicle (in units of kg) is denoted by "M", the wheelbase of the vehicle (in units of m) is denoted by "L". Furthermore, the distance (in units of m) between the center of mass of the vehicle and the front wheel axle of the vehicle is denoted by "Lf", and the distance (in units of m) between the center of mass of the vehicle and the rear wheel axle of the vehicle is denoted by "Lr". Also, the vehicle speed (the moving speed of the vehicle) is denoted by "V" (in units of m/sec), and the steering angle of the steering wheel is denoted by "δ" (in units of rad). In addition, the tire cornering power of the front wheel is denoted by "Kcf" (in units of N/rad), and the tire cornering power of the rear wheel is denoted by "Kcr" (in units of N/rad). Based on these measurements, it is known to express the turning radius ρ by the following Equation (2).

$$\rho = \left(1 - \frac{M}{2L^2}\frac{LfKcf - LrKcr}{KcfKcr}V^2\right)\frac{L}{\delta} \quad (2)$$

$$= (1 + AV^2)\frac{L}{\delta}$$

In the above Equation (2), "A" denotes the stability factor, which is expressed by the following Equation (3) and is vehicle specific.

$$A = -\frac{M}{2L^2}\frac{LfKcf - LrKcr}{KcfKcr} \quad (3)$$

The turning radius ρ can be expressed by the following Equation (4) based on the vehicle speed V and the yaw rate γ.

$$\rho = V/\gamma \quad (4)$$

Also, based on the Equations (2) and (8), the yaw rate γ can be expressed by the following Equation (5).

$$\gamma = \frac{1}{1+AV^2}\frac{V}{L}\delta \quad (5)$$

Similarly, the slip angle β at the time of the steady circular turn of the vehicle can be expressed by the following Equation (6).

$$\beta = \frac{1-KV^2}{1+AV^2}\frac{Lr}{L}\delta \quad (6)$$

In the above Equation (6), "K" is defined by the following Equation (7).

$$K = \frac{M}{2L} \frac{Lf}{LrKcr} \quad (7)$$

Thus, based on the Equations (5) and (6), the following Equation (8) is derived.

$$V\beta = (1 - KV^2)Lr\gamma \quad (8)$$
$$= \alpha \cdot d \cdot \gamma$$

In the above Equation (8), $\alpha = (1-KV^2)Lr/d$. The transverse moving speed $d \cdot \gamma$ of the point of regard, which is caused by the rotational angular speed, is proportional to the transverse moving speed $V\beta$, which is caused by the side slip. It has been confirmed that the transverse moving speed $V\beta$ is increased relative to the transverse moving speed $d \cdot \gamma$ at a predetermined gradient $\alpha$. Thus, the above equation (8) can be also expressed to indicate that the transverse moving speed $V\beta$ increases relative to the transverse moving speed $d \cdot \gamma$ at the gradient $\alpha$.

Because of the above relationships, the transverse moving speed $d \cdot \gamma$ can be expressed by the following Equation (9).

$$d \cdot \gamma = \left[\frac{1}{1+\alpha}\right] Vy\_flow \quad (9)$$

Also, the transverse moving speed $V\beta$ can be expressed by the following Equation (10).

$$V\beta = \left[\frac{\alpha}{1+\alpha}\right] Vy\_flow \quad (10)$$

Therefore, the yaw rate $\gamma$ can be expressed by the flowing Equation (11).

$$\gamma = \frac{1}{d}\left[\frac{1}{1+\alpha}\right] Vy\_flow \quad (11)$$

Also, the slip angle $\beta$ can be expressed by the following Equation (12).

$$\beta = \frac{1}{V}\left[\frac{\alpha}{1+\alpha}\right] Vy\_flow \quad (12)$$

In the above described manner, the yaw rate $\gamma$ and the slip angle $\beta$ can be obtained based on the optical flow.

Thus, in the present embodiment, when the ECU 3 receives the signal from the wheel speed sensor 2 and the image data from the on-vehicle camera 1, the ECU 3 determines the vehicle speed V and also obtains the optical flow. Then, the ECU 3 applies the vehicle speed and the optical flow as "V" and "Vy_flow" of the above Equations (11) and (12) to determine the yaw rate $\gamma$ and the slip angle $\beta$.

The factors of the Equations (15), (16) other than "V" and "Vy_flow" should be determined based on the subject vehicle type and the subject tire type. Thus, the yaw rate $\gamma$ and the slip angle $\beta$ can be obtained based on "V" and "Vy_flow".

Next, the vehicle state sensing system of the present embodiment will be described with reference to FIG. 5.

Figure 5:
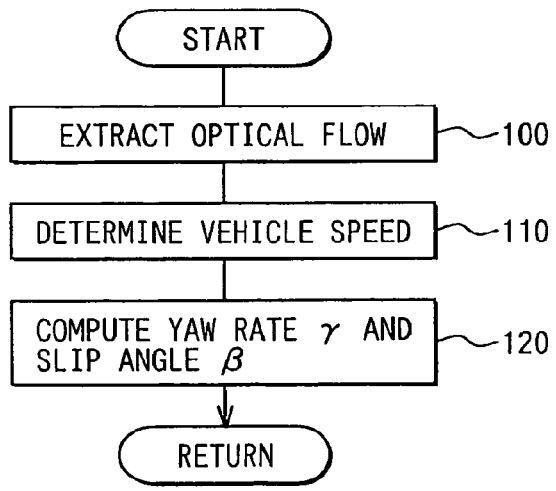
FIG. 5 is a flowchart, which indicates a process performed by an ECU of the vehicle state sensing system of FIG. 1.

FIG. 5 is a flowchart, which indicates a vehicle state sensing process performed by the ECU 33. The process of the flowchart is executed when, for example, an ignition switch of the vehicle is turned on.

First, when the image, which indicates the scene outside the vehicle, is captured through the on-vehicle camera 1, the image data of the captured image is transmitted to the ECU 33. When the wheel speed sensor 22 outputs the measurement signal, which indicates the rotation of the corresponding wheel, the measurement signal is transmitted from the wheel speed sensor 22 to the ECU 33.

In this way, the ECU 33 performs the vehicle state sensing process shown in FIG. 5. Initially, at step 100, the optical flow is extracted from the image data at the predetermined time intervals (e.g., the image data capturing time intervals, which are determined based on the resolution of the on-vehicle camera 1). The extraction is performed by obtaining the transverse moving distance based on the image coordinate of the point of regard in the image data.

Next, at step 110, the vehicle speed at the time of extracting the optical flow is determined based on the measurement signal of the wheel speed sensor 22.

Then, at step 120, the yaw rate $\gamma$ and the slip angle $\beta$ are computed by using the extracted optical flow and the vehicle speed as "Vy_flow" and "V" in the above Equations (11) and (12). In this way, the yaw rate $\gamma$ and the slip angle $\beta$ are obtained. By repeating the above process, the yaw rate $\gamma$ and the slip angle $\beta$ can be always obtained during the traveling of the vehicle.

As described above, in the vehicle state sensing system of the present embodiment, the image of the front visual scene on the front side of the vehicle is captured by the on-vehicle camera 1. Then, the optical flow is extracted from the image data of the captured image to obtain the yaw rate $\gamma$ and the slip angle $\beta$. In this way, the state of the vehicle, such as the translational movement of the vehicle or the rotational movement of the vehicle about the center of mass, can be sensed based on the image data of the image, which is captured through the on-vehicle camera 1.

In general, humans outperform the computers with respect to the recognizing capability for recognizing a specific subject, such as a white line, a vehicle, a pedestrian or an obstacle, from its background scene in the captured image, which is captured through the on-vehicle camera 1. However, the computers outperform the humans with respect to the recognizing capability for exactly monitoring the movement of the vehicle relative to the surrounding environment. Thus, as described above, when the moving state of the vehicle is sensed based on the optical flow through use of the ECU 3, the moving state of the vehicle can be more precisely sensed. Based on the sensed result of the moving state of the vehicle, the various vehicle driving control operations can be performed.

In the above embodiment, the measurement signal of the wheel speed sensor 2 is used to obtain the vehicle speed. However, the vehicle speed can be determined based on a measurement signal, which is outputted from a vehicle speed sensor. Furthermore, the image of the front visual scene on the front side of the vehicle is captured by the on-vehicle camera 1. However, the present invention is not limited to the image of the front visual scene on the front side of the vehicle and can be equally applicable to an image of any other appropriate outside visual scene, which is taken in any other direction and includes the translational movement of the vehicle in the transverse direction and the rotational movement of the vehicle about the center of mass.

Additional advantages and modifications will readily occur to those skilled in the art. The invention in its broader terms is therefore not limited to the specific details, representative apparatus, and illustrative examples shown and described.

What is claimed is:

1. A vehicle state sensing system comprising:
    an image recognizing means that is installed in a vehicle, wherein the image recognizing means is for capturing an image of an outside visual scene that is outside of the vehicle and is for outputting image data of the captured image;
    a vehicle speed sensing means for outputting a measurement signal, which corresponds to a moving speed of the vehicle; and
    a vehicle state determining means for determining a state of the vehicle based on the measurement signal of the vehicle speed sensing means and an optical flow of a predetermined point of the captured image, which is captured during traveling of the vehicle, wherein the optical flow of the predetermined point is obtained based on the image data of the captured image, wherein
    the vehicle state determining means determines, as the state of the vehicle, at least one of a slip angle, which indicates a translational movement of the vehicle in a transverse direction of the vehicle, and a yaw rate, which indicates a rotational movement of the vehicle about a center of mass of the vehicle, wherein the vehicle state determining means determines the slip angle of the vehicle using the following equation $$\beta = 1/V[\alpha/1+\alpha]Vy\_flow$$

where:
    $\alpha = (1-KV^2)Lr/d$;
    $K = M/2L\ Lf/LrKcr$;
    "β" denotes the slip angle of the vehicle;
    "V" denotes the moving speed of the vehicle;
    "Vy flow" denotes the optical flow of the predetermined point;
    "d" denotes a distance between the vehicle and a point of regard of the outside visual scene, which corresponds to the predetermined point of the captured image;
    "M" denotes a mass of the vehicle;
    "L" denotes a wheelbase of the vehicle;
    "Lf" denotes a distance between a center of mass of the vehicle and a front wheel axle of the vehicle;
    "Lr" denotes a distance between the center of mass of the vehicle and a rear wheel axle of the vehicle; and
    "Kcr" denotes a tire cornering power of a rear wheel of the vehicle.

2. A vehicle state sensing system comprising:
    an image recognizing means that is installed in a vehicle, wherein the image recognizing means is for capturing an image of an outside visual scene that is outside of the vehicle and is for outputting image data of the captured image;
    a vehicle speed sensing means for outputting a measurement signal, which corresponds to a moving speed of the vehicle; and
    a vehicle state determining means for determining a state of the vehicle based on the measurement signal of the vehicle speed sensing means and an optical flow of a predetermined point of the captured image, which is captured during traveling of the vehicle, wherein the optical flow of the predetermined point is obtained based on the image data of the captured image, wherein
    the vehicle state determining means determines, as the state of the vehicle, at least one of a slip angle, which indicates a translational movement of the vehicle in a transverse direction of the vehicle, and a yaw rate, which indicates a rotational movement of the vehicle about a center of mass of the vehicle, wherein the vehicle state determining means determines the yaw rate of the vehicle using the following equation $$\gamma = 1/d[1/1+\alpha]Vy\_flow$$

where:
    $\alpha = (1-KV_2)Lr/d$;
    $K = M/2L\ Lf/LrKcr$;
    "γ" denotes the yaw rate of the vehicle;
    "V" denotes the moving speed of the vehicle;
    "Vy_flow" denotes the optical flow of the predetermined point;
    "d" denotes a distance between the vehicle and a point of regard of the outside visual scene, which corresponds to the predetermined point of the captured image;
    "M" denotes a mass of the vehicle;
    "L" denotes a wheelbase of the vehicle;
    "Lf" denotes a distance between a center of mass of the vehicle and a front wheel axle of the vehicle;
    "Lr" denotes a distance between the center of mass of the vehicle and a rear wheel axle of the vehicle; and
    "Kcr" denotes a tire cornering power of a rear wheel of the vehicle.

3. A vehicle state sensing method comprising:
    obtaining a moving speed of a vehicle;
    obtaining image data of an image of an outside visual scene that is outside of the vehicle and is captured by an image recognizing means during traveling of the vehicle;
    obtaining an optical flow of a predetermined point of the captured image based on the image data; and
    determining a state of the vehicle based on the moving speed of the vehicle and the optical flow of the predetermined point, wherein
    the determining of the state of the vehicle includes determining as the state of the vehicle at least one of a slip angle, which indicates a translational movement of the vehicle in a transverse direction of the vehicle, and a yaw rate, which indicates a rotational movement of the vehicle about a center of mass of the vehicle, wherein the determining of the slip angle of the vehicle includes determining of the slip angle of the vehicle using the following equation $$\beta = 1/V[\alpha/1+\alpha]Vy\_flow$$

where:
    $\alpha = (1-KV^2)Lr/d$;
    $K = M/2L\ Lf/LrKcr$;
    "β" denotes the slip angle of the vehicle;
    "V" denotes the moving speed of the vehicle;
    "Vy flow" denotes the optical flow of the predetermined point;
    "d" denotes a distance between the vehicle and a point of regard of the outside visual scene, which corresponds to the predetermined point of the captured image;
    "M" denotes a mass of the vehicle;
    "L" denotes a wheelbase of the vehicle;

"Lf" denotes a distance between a center of mass of the vehicle and a front wheel axle of the vehicle;

"Lr" denotes a distance between the center of mass of the vehicle and a rear wheel axle of the vehicle; and "Kcr" denotes a tire cornering power of a rear wheel of the vehicle.

4. A vehicle state sensing method comprising:

obtaining a moving speed of a vehicle;

obtaining image data of an image of an outside visual scene that is outside of the vehicle and is captured by an image recognizing means during traveling of the vehicle;

obtaining an optical flow of a predetermined point of the captured image based on the image data; and determining a state of the vehicle based on the moving speed of the vehicle and the optical flow of the predetermined point, wherein the determining of the state of the vehicle includes determining as the state of the vehicle at least one of a slip angle, which indicates a translational movement of the vehicle in a transverse direction of the vehicle, and a yaw rate, which indicates a rotational movement of the vehicle about a center of mass of the vehicle, wherein the determining of the yaw rate of the vehicle includes determining of the yaw rate of the vehicle using the following equation $$\gamma = 1/d[1/1+\alpha]Vy\_flow$$

where:

$\alpha = (1-KV^2)Lr/d$;

$K = M/2L\ Lf/LrKcr$;

"$\gamma$" denotes the yaw rate of the vehicle;

"V" denotes the moving speed of the vehicle;

"Vy_flow" denotes the optical flow of the predetermined point;

"d" denotes a distance between the vehicle and a point of regard of the outside visual scene, which corresponds to the predetermined point of the captured image;

"M" denotes a mass of the vehicle;

"L" denotes a wheelbase of the vehicle; "Lf" denotes a distance between a center of mass of the vehicle and a front wheel axle of the vehicle;

"Lr" denotes a distance between the center of mass of the vehicle and a rear wheel axle of the vehicle; and "Kcr" denotes a tire cornering power of a rear wheel of the vehicle.

* * * * *